UNITED STATES PATENT OFFICE.

ARCHIBALD K. LEE, OF GALVESTON, TEXAS, ASSIGNOR TO HIMSELF, GEORGE W. MIDDLETON, AND JOSEPH C. SMITH.

IMPROVEMENT IN MANUFACTURING ANTI-CORROSIVE COMPOUNDS.

Specification forming part of Letters Patent No. 158,095, dated December 22, 1874; application filed December 12, 1874.

*To all whom it may concern:*

Be it known that I, ARCHIBALD K. LEE, of the city and county of Galveston and State of Texas, have invented an Improved Anti-Corrosive Coating for Metals, of which the following is a full, clear, and exact description:

The object of my present improvement is to provide an anti-corrosive coating for iron and all other metals, and one which in all respects does positively preserve the same, and into the composition of which enters as an element neither lead, oil, nor any other ingredient that contains any destructive or otherwise deleterious acid or alkali.

It is a fact well known to all familiar with the branch of art to which my improvement relates, that all paints and other substances that are now used as a coating to protect metals from decay when exposed to the action of the elements or other destructive influences do contain such an acid as not only tends to oxidize or rust the iron or other metal, but eventually to eat into and destroy the very fibers of which the iron is composed.

The materials of which my composition is composed are all well-known antiseptics in their nature, and when combined as I propose in my present invention, form a most perfect anti-corrosive composition, and one which in no manner can be injurious to the metal, while, on the other hand, it not only prevents corrosion, oxidization, or rust, but when applied to metals after these have partially set in, or their destructive action has been begun, will positively arrest the same.

The nature of my invention consists in forming an anti-corrosive composition for metals, of asphaltum, paraffine, and black oxide of manganese, each rendered fluid without being subjected to heat, but by being simply subjected to the action of a product produced from crude turpentine distilled at the lowest possible degree of temperature, and from which the pyroligneous-acid water has been liberated during the process of distillation, or rather while the turpentine is yet in vapor. To these elements in the formation of the composition, practical experience has fully demonstrated powdered soap-stone, slate, or other equivalent substance may be most advantageously added; not that they possess any chemical value, for this they do not, but they serve to add consistency to the composition and prevent its cracking or breaking after having dried on the metal.

The product hereinbefore referred to as resulting from the distillation of crude turpentine at the lowest possible degree of heat, and from which the pyroligneous-acid water is liberated while the turpentine is yet in vapor, and which I propose to make the subject matter of an independent application for Letters Patent of the United States, bears in its action no resemblance whatever to what is known in commerce as the ordinary spirits of turpentine, as there exists between the two products a difference as marked as exists between ordinary distilled "high wines" and "French Cologne spirits," or refined, deodorized, concentrated alcohol. What is recognized as ordinary spirits of turpentine will not, without heat, reduce to a liquid form asphaltum, the most powerful in its action as an antiseptic of the ingredients which enter into my composition, while the product which I procure from crude turpentine will readily produce an asphaltic liquid without any heat whatever; and in thus reducing the asphaltum to a liquid form without heat constitutes not only one of the chief, but most important, advantages of my invention, and permits of the most valuable antiseptic properties of the asphaltum being utilized for the purpose contemplated in my invention, and which, previous to the same, has been deemed impracticable, and for this reason: Heretofore, to liquidize asphaltum, it has been invariably subjected to the action of an intense heat, and which volatizes or vaporizes its most valuable antiseptic properties, liberating the same in a manner as to leave the residuum little better than a good article of ordinary pitch; but it will readily be seen that all these valuable antiseptic properties I retain and hold, as I avoid all heat, and hence the immense value and importance of liquidizing the asphaltum as I contemplate doing—that is, simply by subjecting the same to the action of the product which I obtain from crude turpentine, as hereinbefore stated. This product is also most valuable as an agent in liquidizing the paraffine, not only in avoiding the use of all heat, but it accomplishes what never before has been successfully attained—that is, it will retain the paraffine in a liquid form after the same has been freed from its oil.

The construction and operation of my invention are as follows: To form my composition I take sixty-five (65) parts of asphaltum, twenty (20) parts of paraffine, five (5) parts of black oxide of manganese, and ten (10) parts of soap-stone or its equivalent, the asphaltum, paraffine, and black oxide of manganese, each having been previously rendered fluid through the action of the product which I obtain from distilling crude turpentine at the lowest possible degree of temperature, and in separating the pyroligneous acid therefrom during the process of distillation, or while the turpentine is yet in vapor. To obtain this product, the still should not, as is the common practice, be charged directly with the crude turpentine, but the same, having been previously properly liquidized in a suitable vessel or chamber should be fed to the still in such quantities as will insure its vaporization at a degree of heat not exceeding, say, 225°. The turpentine vaporized at this degree of heat avoids all danger of destroying or burning out any of its valuable properties. The still used should be so connected with a separating-chamber that the turpentine as rapidly as vaporized will pass thereto, and where it will be separated from its pyroligneous-acid water, by the specific gravity of the pyroligneous-acid water being much heavier than the turpentine, which will cause it to fall to the bottom of the separating-chamber, leaving the yet volatile turpentine floating on top, and from which it passes to the ordinary condensing-column, there to be condensed in the usual manner. The result is, that by this simple act of separating the pyroligneous-acid water from the turpentine while the latter is yet in vapor, I obtain a product that is not the ordinary spirits of turpentine of commerce, but a pure oil of turpentine, far superior to the oil of turpentine recommended by the London and Dublin Pharmacopœia for medicinal purposes, and which results from the redistillation of the ordinary spirits of turpentine over potash, and is recognized as the oil of terebinthæ. These are placed in a suitable vessel and stirred or mixed until the different ingredients become thoroughly incorporated together, and the composition is then ready for use, and may be applied with a brush, or by immersing the metal therein.

I desire it distinctly understood that, while the foregoing formula or proportions form a composition which practical experience has demonstrated is most admirably adapted for the purposes designed, there is nothing arbitrary about the proportions, as these may be varied without altering or changing the scope of my invention.

The above composition is equally valuable as a coating for wood, as it not only acts as a preserver, preventing and arresting its rapid decay, but is effective in preventing the operation of the teredo, that bore and penetrate the bottoms of ships and other submerged wood.

What I claim as new, and desire to secure by Letters Patent of the United States, is—

The herein-described process of manufacturing an anti-corrosive compound, consisting in distilling turpentine at about 225°, separating the pyroligneous-acid water therefrom, dissolving paraffine and asphaltum in the cold in the purified distillate, and mixing with the product black oxide of manganese and soap-stone, substantially as described.

In testimony whereof I have signed my name to this specification in the presence of two subscribing witnesses.

ARCHIBALD K. LEE.

Witnesses:
  EDWIN JAMES,
  JOS. T. K. PLANT,